(12) United States Patent
Young et al.

(10) Patent No.: US 8,478,754 B2
(45) Date of Patent: Jul. 2, 2013

(54) METHOD AND SYSTEM FOR PERSONALITY COMPARISON VIA PUBLIC CONSENSUS

(75) Inventors: John Cameron Young, Palo Alto, CA (US); Andrew Stevyn Platter, Vista, CA (US)

(73) Assignee: Piracloud, Inc., Palo Alto, CA (US)

( * ) Notice: Subject to any disclaimer, the term of this patent is extended or adjusted under 35 U.S.C. 154(b) by 0 days.

(21) Appl. No.: 13/314,461

(22) Filed: Dec. 8, 2011

(65) Prior Publication Data

US 2012/0150822 A1    Jun. 14, 2012

Related U.S. Application Data

(60) Provisional application No. 61/421,140, filed on Dec. 8, 2010.

(51) Int. Cl.
| | | |
|---|---|---|
| *G06F 7/00* | (2006.01) | |
| *G06F 17/00* | (2006.01) | |
| *G06F 17/30* | (2006.01) | |
| *G06Q 99/00* | (2006.01) | |

(52) U.S. Cl.
USPC ............ 707/733; 707/690; 707/947; 705/319

(58) Field of Classification Search
USPC .................. 707/690, 733, 941, 947; 705/319
See application file for complete search history.

(56) References Cited

U.S. PATENT DOCUMENTS

| | | | |
|---|---|---|---|
| 2004/0059705 A1* | 3/2004 | Wittke et al. ...................... 707/1 |
| 2006/0046233 A1* | 3/2006 | Byham ......................... 434/236 |
| 2007/0196798 A1* | 8/2007 | Pryor et al. ................... 434/236 |
| 2008/0220400 A1* | 9/2008 | Cox et al. ...................... 434/236 |
| 2009/0276294 A1* | 11/2009 | Roecker ............................ 705/7 |

* cited by examiner

*Primary Examiner* — Greta Robinson
*Assistant Examiner* — Brian E. Weinrich
(74) *Attorney, Agent, or Firm* — Pepper Hamilton LLP (57) ABSTRACT

A method and system of comparing data sets related to personality traits to identify various comparison results are disclosed. The method and system include determining, by a processing device, a plurality of data sets. The data sets include information related to a self-evaluation report for a first user based upon the first user's answers to a set of questions. The data sets also include information related to anonymous, aggregated data received from other users. The first user may select a context for performing a comparison of two or more of the data sets, including a self-evaluation report, an aggregated public perception of the first user, or an aggregated public perception of another user. The system performs the comparison to produce comparison results. The comparison results provide the first user with information related to their individual personality and/or information related to an existing or potential relationship between the first user and another user.

20 Claims, 5 Drawing Sheets

METHOD AND SYSTEM FOR PERSONALITY COMPARISON VIA PUBLIC CONSENSUS

CROSS-REFERENCE TO RELATED APPLICATION

This application claims priority to U.S. Provisional Patent Application No. 61/421,140, filed Dec. 8, 2010, the disclosure of which is incorporated herein by reference in its entirety.

BACKGROUND

The present disclosure relates to a personality comparison tool. More specifically, the present disclosure relates to a personality assessment tool based upon aggregation of self-evaluations and third-party evaluations.

Personality tests have been common tools for determining various aspects related to a test-taker. The various aspects may be used to rate the test-taker for various purposes, such as determining potential relationships, determining career advice, performing psychological analysis, and other related purposes. A common type of personality test is the self-report inventory or self-evaluation. A self-evaluation typically involves the administration of multiple questions to test-takers who respond by rating the degree to which each question reflects their behavior. A sample item on a personality test, for example, may ask a test-taker to rate the degree to which they agree with a statement by using a scale of 1 (representing "I strongly disagree") to 5 (representing "I strongly agree"). However, typical personality tests suffer from multiple characteristics that slow their usefulness in an online connected world where social media and other similar sites are becoming an increasingly common way for people to meet and connect.

A preferred personality test is the Five Factor Model (FFM). However, one of the five factors is "neuroticism," and questions in this assessment typically include "I get stressed out easily," or "I dislike myself." A test-taker may be biased when answering these questions based upon the intended use of the results of the personality test. For example, if the test-taker is taking the personality test in application for a job, the test-taker is motivated to answer the questions in a light that would be favorable to the test-taker given the situation. Another popular personality test, the Myers-Briggs Type Indicator (MBTI), differentiates between "Extrovert" and "Introvert," and between "Judging" and "Planning." Again, a test-taker's responses may be skewed based upon the situation in which the personality test is taken. Additionally, a reasonably person may be put off by the potential outcomes of the personality tests and choose not to take the test, leaving their personality type unknown for fear of embarrassment or being taken advantage of due to some apparent weakness indicated by the personality test.

Personality tests are generally administered with a sense of secrecy. The tests have not adapted to an online connected world where peoples' friend relationships are easily accessible, and where an in-depth review of such relationships is a non-cumbersome prospect. Current assessments typically start and end with self-reported data (e.g., a user completes the self-evaluation and views their individual results). Another person's data is collected in a similar manner and considered private to them. Thus, comparative and crowd-sourced data is cumbersome to collect and display.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a method of comparing data sets. The method includes determining, by a processing device, a plurality of data sets based upon at least self-evaluation data and anonymous, aggregated data; comparing, by the processing device, at least two of the plurality of data sets to produce comparison results; and displaying, via a display operably connected to the processing device, the comparison results.

In another general respect, the embodiments disclose a system for comparing data sets. The system includes at least one user device, a processing device operably connected to the at least one user device and a non-transitory computer readable storage medium operably connected to the processing device and configured to store at least the self-evaluation report, the at least one other data set, and a set of instructions. The set of instructions are configured to instruct the processor to determine a plurality of data sets based upon at least self-evaluation data and anonymous, aggregated data, compare at least two of the plurality of data sets to produce comparison results and display the comparison results.

DETAILED DESCRIPTION

The present disclosure relates to a system and method for comparing people as well as public perceptions of people. Specifically, the comparison is done based upon comparing specific personalities and characteristics, tendencies, and interests of people, as determined by their personalities, against other people's personalities. In a general respect, the comparison is performed between at least two data sets, the data sets potentially including a self-report or evaluation for a user, a public perception of the user, and a public perception of another user. A comparison of any two of these data sets may present a user with a useful set of data specific to that proposed relationship.

It should be noted that, as used herein, contributors to the information contained within a public perception remains anonymous to the person the public perception is about. However, the system may maintain specific data about how an individual responded to questioning about another person. This information may be used in developing the public perception for that second user. As such, the system may be considered omnipotent in regards to information related to and received from various users, while information collected about a user remains anonymous to that specific user or other users for privacy purposes.

More specifically, the comparison is based upon information gathered based upon anonymous and aggregated opinions of other relevant people (i.e., "crowdsourcing") on a specific topic, thereby forming a public consensus on that specific user. The public consensus may then be compared to other consensuses (such as a self-evaluation) to yield information such as hidden strengths for a particular user. The public consensus of another person may also be compared to either a self-reported topic, or the public consensus of the user, to enable valuable insight into how the user may proceed in relation to that topic. For example, a user may have a business proposal to present to a manager at a company. The user may compare their self-evaluation against the public consensus for the manager to determine how best to prepare for and approach presenting the business proposal. This presents a useful tool for comparing two people's personalities when the two people have not yet met.

The comparisons may start with basic personality and may expand out to other traits or comparison contexts such as style, habits, brand affinity, vocation, romantic capability, subject familiarity, and other various topics. The present invention aims to provide valuable information to users about how they relate to other people, and how to improve relationships with other people. The business result of this is an aggregated database including information related to what people think about other people, across a wide range of topics.

One embodiment provides a personality comparison based upon users' responses to various questions. Users are invited to take a personality assessment that classifies them in a four axis, eight polar type system. Questions may be structured such that a question is followed by two answers, one of which the user selects. A user may complete a set of questions, revealing tendencies related to the user on each of the four axes. Each axis is ranked as a primary type, a secondary type, a tertiary type and a quaternary type. The user may be provided information related to the results of their test such as their primary type as well as additional information related to the other types. This model may be tailored to a crowdsourcing environment, thereby reducing traditional negatives associated with personality test scoring. By providing anonymous results, users may be willing to surrender data about people they know in a non-threatening manner.

The present disclosure may further incentivize users to submit additional information about themselves and others. In the case of information submitted about others, a public consensus personality nexus (PCPN) may be built including aggregate opinions of everyone who "knows" a person. The PCPN may be held separately from the user self-evaluation report such that the information is accessible to the user in a structured and anonymous format. "Knowing" a person may be determined by accessing various unique identifiers associated with a person, such as email address, social network information, and other information that may serve as a unique referent for a user. Additionally, the current system may include an option for a user to create a profile specifically related to the personality comparison tools.

Optionally, relationship weighting may be used to organize the aggregated opinions of a particular user. Relationship weight may result in various methods of determining how well a user's opinion about another user may be trusted. For example, the opinion of a user by their boss may have a higher weighting than the opinion of a former coworker. In another example, the opinion of a teacher submitted by their student may have a lesser weight than the opinion of the same teacher by the principal overseeing the teacher. Methods of determining this may include self-reported measures of the strength of the relationship (e.g., the boss-employee relationship or the student-teacher relationship) as well as external measures of the quality of the opinions expressed from additional users.

From a particular user's point of view, the comparison system may aggregate multiple combinations of information. For example, the system may aggregate my view about myself, my view about him/her, his/her view about himself/herself, his/her view about me, the public consensus view about me, and the public consensus view of him/her. The present disclosure creates a value by varying the topics considered, the methodology of comparing the various combinations, and the content that is presented to the user based on the interactions of the combinations listed above.

In the case of the personality comparison tools, this may include comparing (1) a self-evaluation personality report for a user, (2) the PCPN of the user, and (3) the PCPN of a selected friend or target. The information may be further analyzed by comparing the differences between (1) and (2). Specifically, given the PCPN primary type for a user as compared to the self-evaluation identified types, hidden strengths unknown to the user may be revealed. The differences between (2) and (3) may also be compared in a similar manner, yielding the ability to "peer between" personalities and offer suggestions for how to improve relationships.

The systems and methods as outlined in the present disclosure produces a useful, concrete and tangible result, specifically actionable information about how people see each other and how to most effectively proceed in interpersonal affairs, based on self-reported and public consensus topic information combined, interpreted, and contextualized. The system and methods are further explained in the following discussion of FIGS. 1-5.

Figure 1:
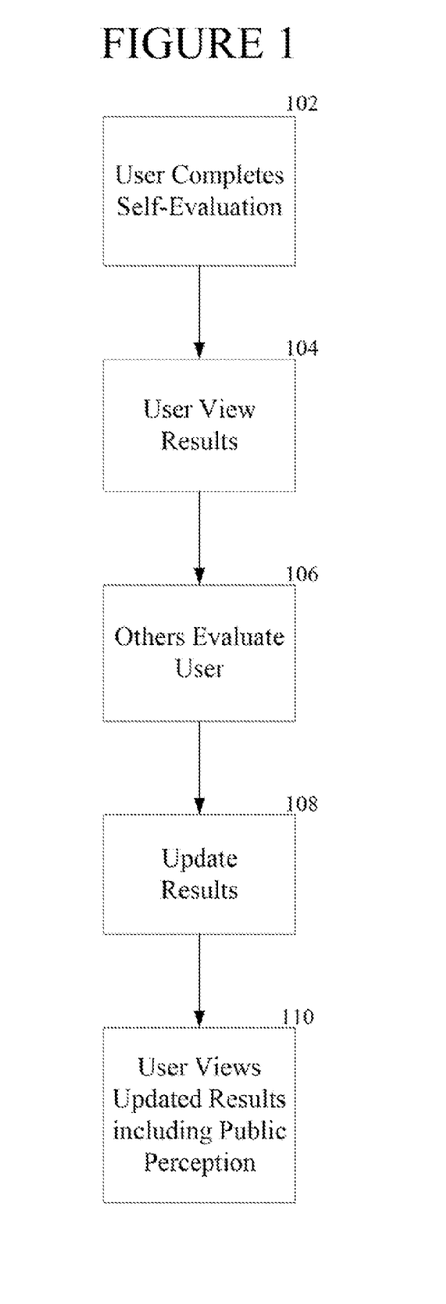
FIG. 1 illustrates a flow diagram for a method of performing a personality comparison according to an embodiment.

FIG. 1 illustrates a flowchart outlining a method for performing a personality comparison according to an embodiment. A user may register or otherwise create an account related to a website or other hosting means for the personality comparison system. The user may then complete 102 a self-evaluation. The self-evaluation may be a set of questions related to a set of axes used to determine the user's specific personality traits.

Figure 2:
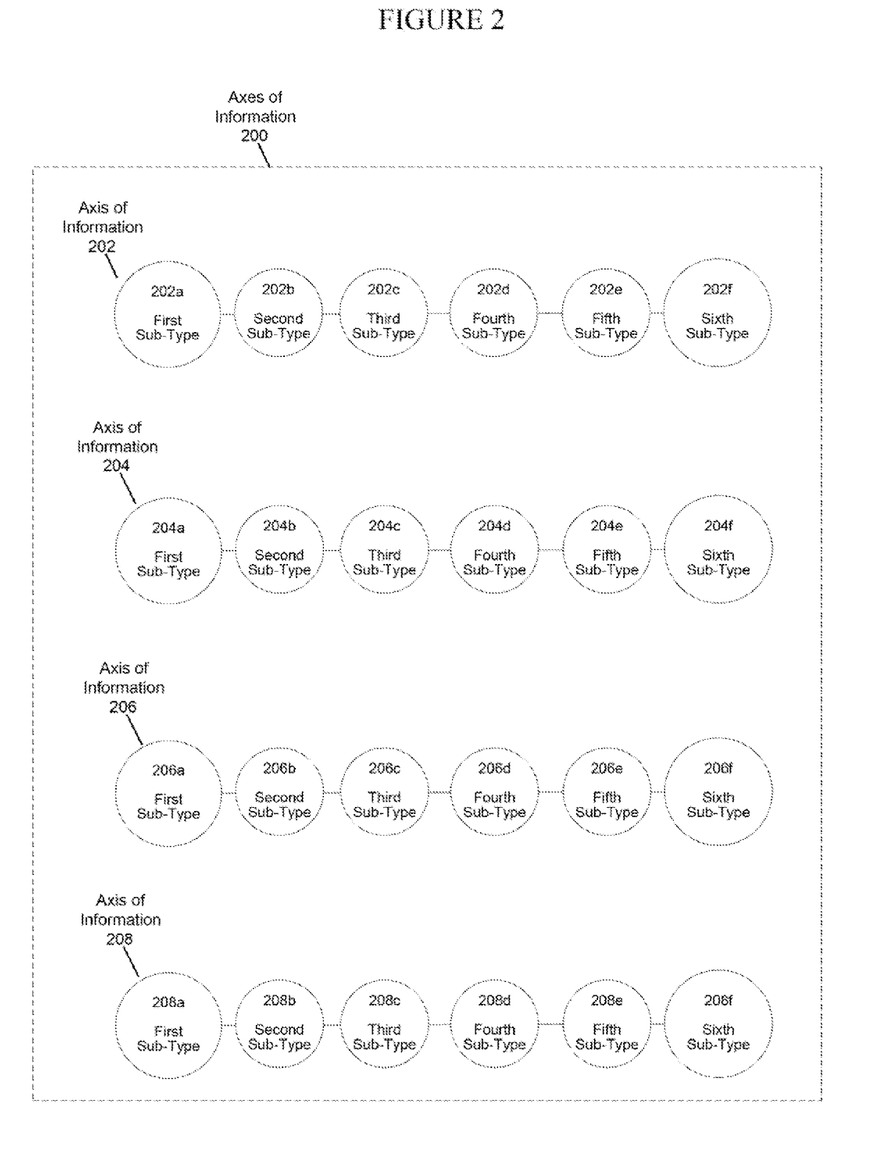
FIG. 2 illustrates a set of axes for determining a user's personality traits according to an embodiment.

For example, FIG. 2 illustrates a set 200 of axes, each axis representing a dimension upon which a personality is ranked and compared. FIG. 2 illustrates four axes 202, 204, 206 and 208. However, it should be noted that four axes are shown by way of example only. Each axis may be related to a specific category. For example, axis 202 may be labeled "Thought", axis 204 may be labeled "People," axis 206 may be labeled "Purpose," and axis 208 may be labeled "Change." Each axis may be divided into multiple types and sub-types, or gradations on the axis, resulting in multiple types and sub-types for each user. For example, the Thought axis 202 may be divided such that the extreme ends are types, and the remaining intermediate points are first sub-type 202*a*, second subtype 202*b*, third subtype 202*c*, fourth 202*d*, fifth subtype 202*e* and sixth sub-type 202*f*. Each extreme end of an individual axis may be labeled or assigned a specific type name. For example, the left extreme end of the Thought axis may be labeled "Investigator" while the right extreme end of the Thought axis may be labeled "Visionary." Each sub-type 202*a* and 202*f* may be labeled as a "Strong." For example, sub-type 202*a* may be labeled "Strong Investigator" while sub-type 202*f* may be labeled "Strong Visionary." Each sub-type may also have a text-string associated with it. For example, the Strong Investigator sub-type 202a may be associated with the text string "analytical, orderly, clear" while the Strong Visionary sub-type 202f may be associated with the text string "imaginative, insightful, futuristic."

Intermediate sub-types may be positioned between the polar sub-types. As with the strong sub-types, each intermediate sub-type may have a particular label and associated text string. To continue the above example, sub-type 202b may be labeled "Minor Investigator," sub-types 202c and 202d may be labeled "Ambivalent Investigator" and "Ambivalent Visionary," and sub-type 202e may be labeled "Minor Visionary."

Each of axes 204, 206 and 208 may be similarly structured. For example, axes 204 may include sub-types 204a, 204b, 204c, 204d, 204e and 204f, axis 206 may include sub-types 206a, 206b, 206c, 206d, 206e, and 206f, and axis 208 may include sub-types 208a, 208b, 208c, 208d, 208e, and 208f.

The self-evaluation as completed 102 by the user may be designed to determine where on each of the four axes 202, 204, 206 and 208 the user falls. For example, using the four axes arrangement as shown in FIG. 2, the self-evaluation may include 26 questions. The first 20 questions may be designed to determine the most prominent personality type in each axis. For example, 5 questions may be designed to determine where on axis 202 the user falls, 5 questions may be designed to determined where on axis 204 the user falls, 5 questions may be designed to determined where on axis 206 the user falls, and 5 questions may be designed to determine where on axis 208 the user falls.

The most prominent personality types for the user may then be compared in the remaining 6 questions (i.e., overall questions 21-26). For example, question 21 may be designed to compare the winner of axis 202 versus the winner of axis 204, question 22 may be designed to compare the winner of axis 202 versus the winner of axis 206, question 23 may be designed to compare the winner of axis 202 versus the winner of axis 208, question 24 may be designed to compare the winner of axis 204 versus the winner of axis 206, question 25 may be designed to compare the winner of axis 204 versus the winner of axis 208, and question 26 may be designed to compare the winner of axis 206 versus the winner of axis 208. Thus, through this line of questioning, each of the prominent personality types may be compared to determine a primary type, a secondary type, a tertiary type and a quaternary type for the user.

A server hosting the personality comparison tool may receive the results of the user's self-evaluation and create a set of results. The user may view 104 the results of their personality test, including one or more of their personality's primary type, a secondary type, a tertiary type and a quaternary type. The user may opt to take multiple self-evaluations to refine the system's understanding of the user's personality. The system may keep a running total of all data submitted, and keep a continuous rating of the user's position on a specific axis to track development over time. A new self-evaluation may cause a user's quintiles or types to change along an axis.

The user may request that additional people complete an evaluation about the user, or others may evaluate the user without an explicit request or prompt. Other people may complete 106 the evaluation related to the user. The information may be collected and associated with a particular user taking the evaluation; however the collected information will be displayed to the user (about whom the information is being collected) anonymously to ensure that the others completing 106 the evaluations answer honestly and openly without fear or anxiety of retribution. The user-based evaluations may be structured similarly to the self-evaluation. An initial set of questions may be used to determine where the other person ranks the user on each of the axes, and a set of comparison questions may be used to determine which personality type the other person ranks highest for the user.

Based upon the others completing 106 the user-based evaluations, the server may receive the user-based evaluations and update the results accordingly. The user results may be updated 108 by the server to include a public perception of the user based upon the user-based evaluations as completed 106 by the other people. The user may view 110 the updated results including this public perception to determine one or more potential actions or goals based upon the public perception as compared to the results of the user's self-evaluation.

Figure 3:
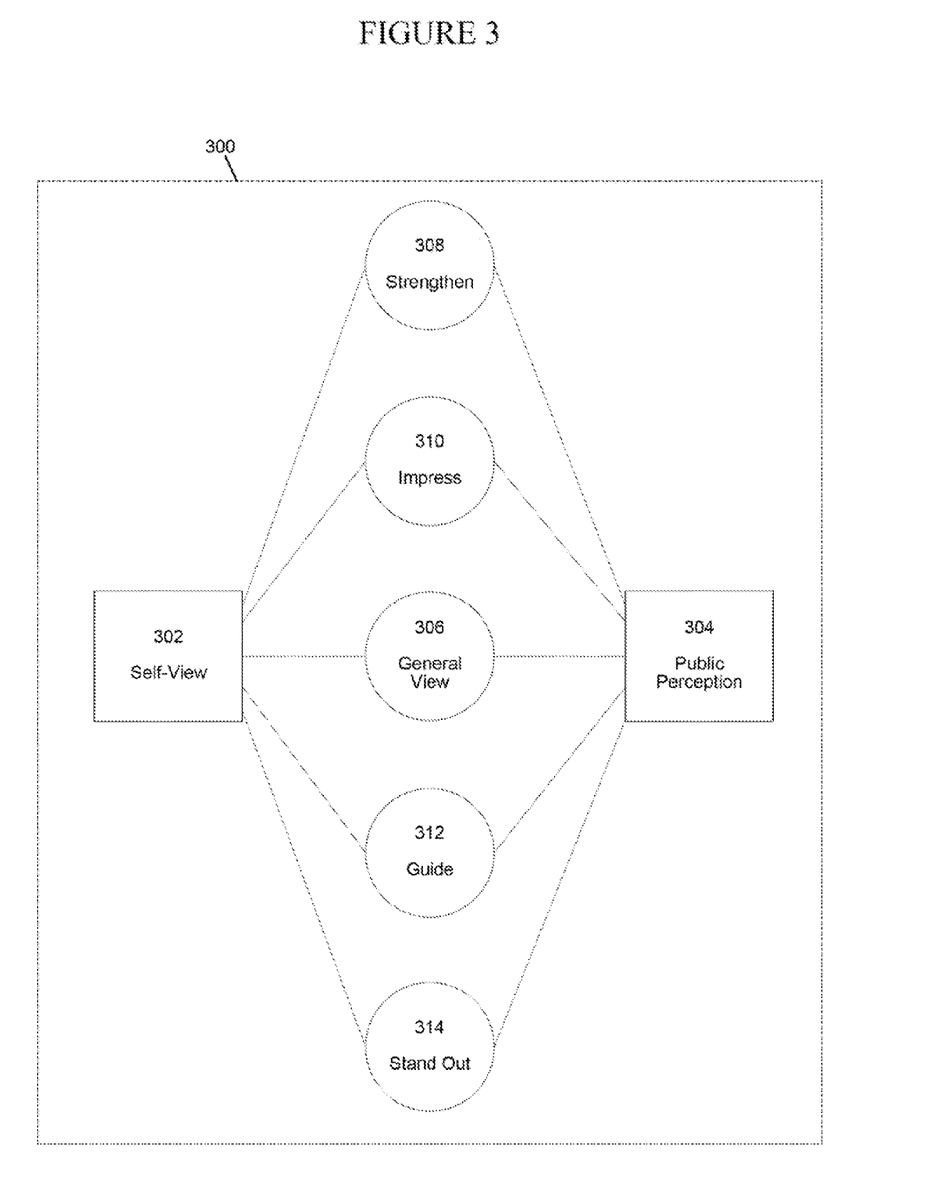
FIG. 3 illustrates a logical set of potential relationship goals according to an embodiment.

FIG. 3 illustrates a representative set 300 of relationship goals or specific contexts for comparing information related to a particular user against another data set. It should be noted in FIG. 3 the square shaped blocks represent information loaded from a data source such as a non-transitory computer readable medium. The round blocks represent a context or type of data comparison between sets of information.

The user may be able to access their self-view 302 of information based upon their answering of the personality test. The self-view 302 may include the information based upon the user's position on the various axes as described in FIG. 2. The user may also have access to a public perception 304 of information related to the user or to another user. This public perception set 304 may be based upon one or more other people completing one or more evaluations of the user or the other user. Linking each set 302 and 304 of information are various relationship contexts and comparison types. For example, the user may select a general view 306 of the relationship between self-evaluation 302 and public perception 304. The general view may simply be a visual comparison of the self-view 302 and the public perception 304.

The user may also select a specific relationship goal for themselves and at least one other person. For example, the user may select to strengthen 308 a relationship between themselves and another person. A strengthening goal 308 may be a long-term process for building a stronger relationship between two people. This may be useful for colleagues, friends, family, classmates and other sets of people who may be in close contact over an extended period of time. The strengthening goal 308 may provide a user with suggestions on how to behave around the other person based upon the tendencies of the other person as determined from the other person's profile.

Another goal may be to impress 310 a target user. The impress goal 310 may be a short-term process for the user to learn about the target and impress them. The impress goal 310 may be useful for interviews, first dates, business meetings or other scenarios where the user wants to make a good first impression. Based upon the target user's profile, the user may receive information based upon how best to approach a situation with the target user.

Another goal may be to guide 312 a target user. The guide goal 312 may be a process for the user to learn about the target and act as a guide for the target through various tasks. The guide goal 312 may be useful for teachers, bosses, parents and other leadership positions where guiding a target may be appropriate. Based upon the target user's profile, the user may receive information based upon the target user's strengths and weaknesses, and how best to use the target user's strengths in a meaningful way.

Another goal may be to stand out 314 to a target user. The stand out goal 314 may be a process for the user to learn about the target and what traits or attributes would stand out to the target user. The stand out goal 314 may be useful for students, employees, children, and other similar positions where impressing a target may be appropriate. Based upon the target user's profile, the user may receive information based upon the target user's favorite traits in another person's personality, and how best to exploit their own personality traits to impress the target user.

Each specific goal as shown in FIG. 3 may have one or more text strings specifically written for that goal and based upon the type of person the user is targeting. For example, a user 302 classified as a "Strong Investigator" may select to strengthen 308 a relationship with a person 304 classified as a "Strong Visionary." Selecting this goal may result in text such as "[Insert Name] is a Strong Visionary. To improve your working relationship with [Insert Name], you should strive to be more imaginative, insightful and futuristic. For example, prepare a presentation outlining potential business opportunities your company could explore in the next five years, including opportunities not traditionally explored by your company."

It should be noted the various goals, contexts and comparison types as shown in FIG. 3 are shown by way of example only to shown a set of interactions between a user's self-view 302 and a public-perception 304, and various comparisons may between the data sets. As outlined above, fundamentally the present invention relates to collecting and maintaining distinct data sets related to various aspects, including, but not limited to, a user's self-evaluation, a public perception of the user, and a public perception of another user. By providing comparisons between these data sets, the present invention provides for a powerful tool for determining information related to existing and potential future relationships between users.

Figure 4:
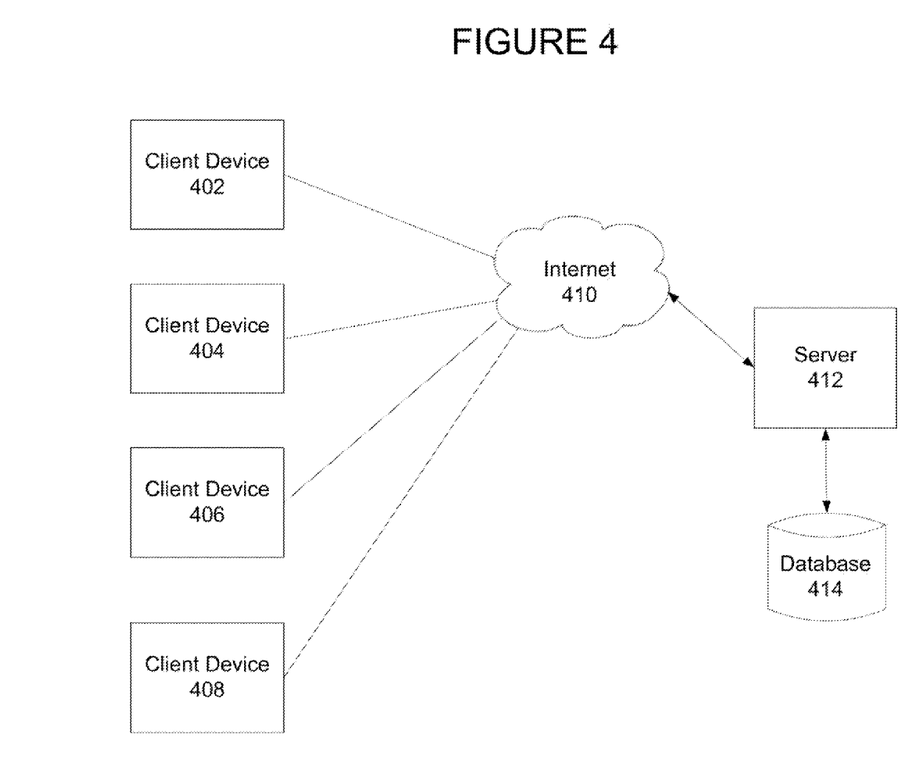
FIG. 4 illustrates a network including various components for hosting and accessing a software program according to an embodiment.

FIG. 4 illustrates an exemplary network for accessing software related to the personality comparison systems and methods as described above. Client devices 402, 404, 406 and 408 may establish a connection to a network such as Internet 410. The operable connection may be a wireless network (e.g., IEEE 802.11n) connection via a Wi-Fi hotspot, a cellular data (e.g., 3G) connection, a wired connection via a local area network, or other similar connections configured to transfer data between computing devices.

A server 412 may be operably connected to the Internet 410 such that a connection may be established between one or more client devices 402, 404, 406 and 408 and the server. The server 412 may be operably connected to a database 414 configured to store aggregated information related to various aspects of the personality comparison, such as stored test results, stored PCPN information, and other related information. A client device, e.g., client device 402, may access software stored on server 412 via a connection through Internet 410. The client device 402 may manipulate the software on server 412 to access information stored on database 414 related to their specific account(s) as outlined in the above description.

It should be noted that client devices 402, 404, 406 and 408 are shown in FIG. 4 by way of example only. In an alternative embodiment, varying numbers and types of client devices may establish an operably connection to server 412.

Figure 5:
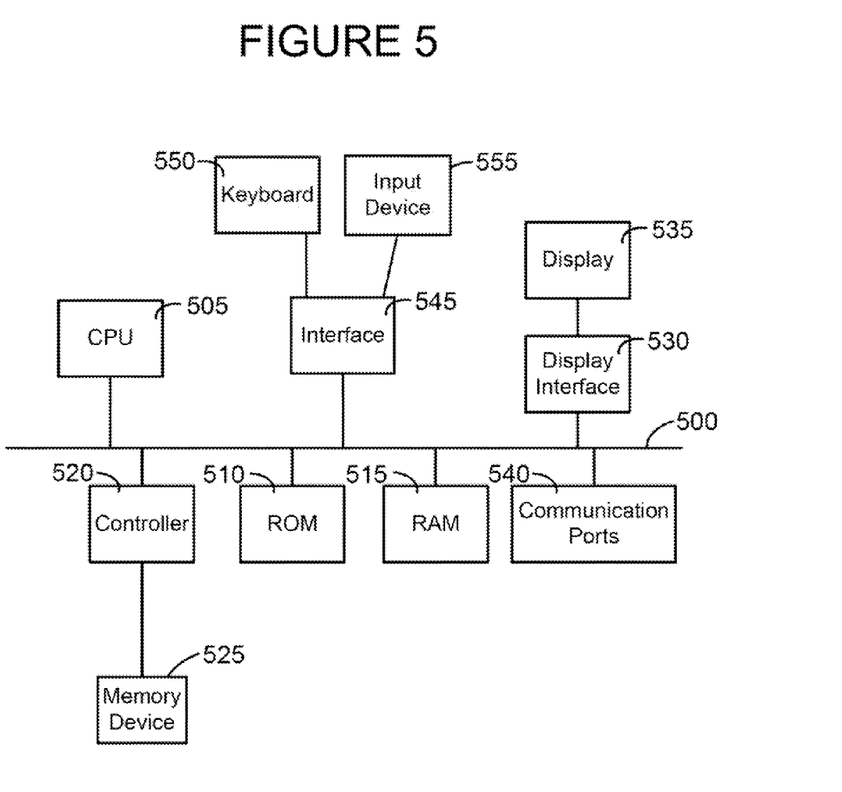
FIG. 5 illustrates a computing device for performing various functions related to the personality comparison as shown in FIG. 1.

FIG. 5 depicts a block diagram of exemplary internal hardware that may be used to contain or implement the various computer processes and systems as discussed above. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices.

A controller 520 interfaces with one or more optional non-transitory memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the personality comparison and evaluation processes as described above may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. The information may include information related to a personality test or results of a personality comparison. Communication with external devices may occur using various communication ports 540. An exemplary communication port 540 may be attached to a communications network, such as the Internet or a local area network.

The hardware may also include an interface 545 which allows for receipt of data from input devices such as a keyboard 550 or other input device 555 such as a mouse, a joystick, a touch screen, a remote control, a pointing device, a video input device and/or an audio input device.

It should be noted various aspects of the invention as described above may be altered or supplemented. For example, specific incentives may be provided to a user for completing various tasks. In one alternative embodiment, points may be provided to a user for every self-evaluation they complete as well as points for every evaluation another person completes related to the user. Accumulated points may be traded for various goods such as detailed reports, reduced subscription fees, and other incentives.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of comparing personality trait data sets, the method comprising:

generating, by a processing device, a plurality of axes of information, wherein each of the plurality of axes of information represent a dimension upon which a personality trait of a user is ranked;

providing, by the processing device, a plurality of questions configured to determine where the user ranks on each of the plurality of axes of information;

receiving, by the processing device, a plurality of answers to the plurality of questions;

ranking the user on each of the plurality of axes of information;

determining, by the processing device, a plurality of personality trait data sets comprising self-evaluation data and anonymous, aggregated data, wherein the plurality of personality trait data sets are determined based upon the plurality of answers;

comparing, by the processing device, at least two of the plurality of personality trait data sets to produce comparison results based upon a comparison context;

generating a running total of the plurality of personality trait data sets;

generating a continuous ranking of at least one of the plurality of axes of information, wherein the continuous ranking is updated responsive to a new evaluation; and displaying, via a display configured to be connected to the processing device, at least a portion of the comparison results.

2. The method of claim 1, wherein providing the plurality of questions comprises:

for each of the plurality of axes of information:
determining a set of questions related to each axis of; and
determining a set of comparison questions related to a comparison of each pair of axes of information.

3. The method of claim 2, wherein receiving the plurality of answers comprises:

receiving a set of answers based upon the set of questions related to each axis of information; and
receiving a set of comparison answers based upon the set of comparison questions.

4. The method of claim 3, wherein determining the self-evaluation data based upon the set of answers comprises:

determining a user position on each axis of information based upon the set of answers; and
ranking each axis of information in order of strength based upon the set of comparison answers.

5. The method of claim 4, wherein determining the self-evaluation data comprises organizing a listing of a user's personality traits based upon the ranking of each axis of information.

6. The method of claim 1, wherein the comparison context comprises at least one of comparing a first user's personality traits against a second user, determining the first user's hidden strengths, strengthening a relationship between the first user and the second user, guiding a target user, impressing the target user, and standing-out to the target user.

7. The method of claim 1, wherein the plurality of personality trait data sets comprises at least one of an anonymous, aggregated public perception of a first user and an anonymous, aggregated public perception of a second user.

8. The method of claim 1, wherein the third-party data comprises data concerning a first user determined from a plurality of answers received from at least one other user having a relationship with the first user, wherein the third-party data is weighted based upon the relationship between the at least one other user and the first user.

9. The method of claim 1, wherein the at least one personality trait comprises at least one of style and brand affinity.

10. The method of claim 1, wherein each of the plurality of axes of information comprise two polar types of the at least one personality trait and a plurality of sub-types configured to indicate a strength of the two polar types.

11. The method of claim 10, wherein each sub-type is associated with at least one label and at least one text-string configured to describe personality attributes associated with the at least one label.

12. A system for comparing personality trait data sets, the system comprising:

at least one communications port;
a processing device configured to be connected to the at least one communications port; and
a non-transitory computer readable storage medium configured to be connected to the processing device and configured to store a set of instructions that instruct the processor to:
generate a plurality of axes of information, wherein each of the plurality of axes of information represent a dimension upon which a personality trait of a user is ranked,
transmit, via the at least one communications port, a plurality of questions configured to determine where a user ranks on each of the plurality of axes of information to at least one user computing device,
receive, from the at least one user computing device, a plurality of answers to the plurality of questions,
rank the user on each of the plurality of axes of information,
determine a plurality of personality trait data sets based upon the plurality of answers, the plurality of personality trait data sets comprising self-evaluation data and anonymous, aggregated data,
compare at least two of the plurality of personality trait data sets to produce comparison results based upon a comparison context,
generate a running total of the plurality of personality trait data sets;
generate a continuous ranking of at least one of the plurality of axes of information, wherein the continuous ranking is updated responsive to a new evaluation; and
transmit, via the at least one communications port, at least a portion of the comparison results to the at least one user computing device.

13. The system of claim 12, wherein the instructions for transmitting the plurality of questions to the at least one user computing device further instruct the processor to:

for each of the plurality of axes of information:
determine a set of questions related to each axis of information and
transmit the set of questions to the at least one user computing device;
determine a set of comparison questions related to a comparison of each pair of axes of information; and
transmit the set of comparison questions to the at least one user computing device.

14. The system of claim 13, wherein the instructions for receiving the plurality of answers further instruct the processor to:

receive a set of answers based upon the set of questions related to each axis of information; and
receive a set of comparison answers based upon the set of comparison questions.

15. The system of claim 14, wherein the instructions for receiving the plurality of answers from the at least one user computing device further instruct the processor to:

determine a user position on each axis of information based upon the set of answers; and
rank each axis of information in order of strength based upon the set of comparison answers.

16. The system of claim 15, wherein the instructions for determining the self-evaluation data further instruct the processor to organize a listing of a user's personality traits based upon the ranking of each axis of information.

17. The system of claim 12, wherein the comparison context comprises at least one of comparing a first user's personality traits against a second user, determining the first user's hidden strengths, strengthening a relationship between the first user and the second user, guiding a target user, impressing the target user, and standing-out to the target user.

18. The system of claim 12, wherein the plurality of personality trait data sets comprises at least one of an anonymous, aggregated public perception of the first user and an anonymous, aggregated public perception of a second user.

19. The system of claim 12, wherein the third-party data comprises data concerning a first user determined from a plurality of answers received from at least one other user having a relationship with the first user,
    wherein the third-party data is weighted based upon the relationship between the at least one other user and the first user.

20. The system of claim 12, wherein each of the plurality of axes of information comprise two polar types of the at least one personality trait and a plurality of sub-types configured to indicate a strength of the two polar types.

\* \* \* \* \*